March 15, 1932.  R. J. TALBOT  1,849,386
POWER PLANT
Filed Oct. 1, 1930  2 Sheets-Sheet 1

INVENTOR.
Richard J. Talbot,
BY
Harry W. Bowen,
ATTORNEY.

March 15, 1932.  R. J. TALBOT  1,849,386
POWER PLANT
Filed Oct. 1, 1930   2 Sheets-Sheet 2
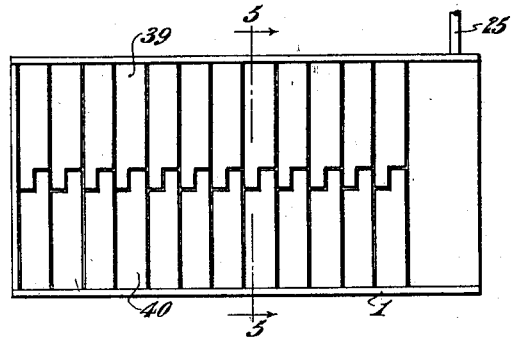
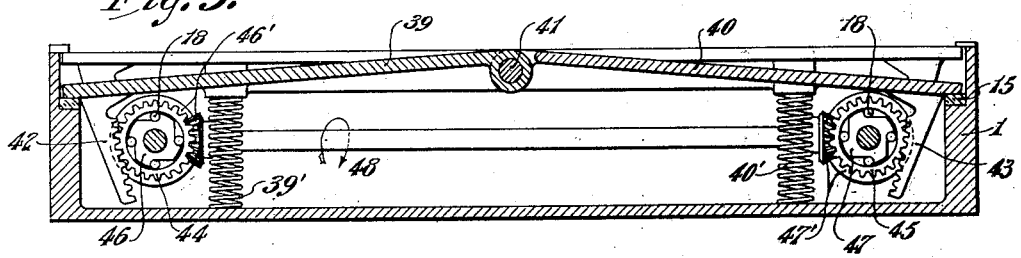
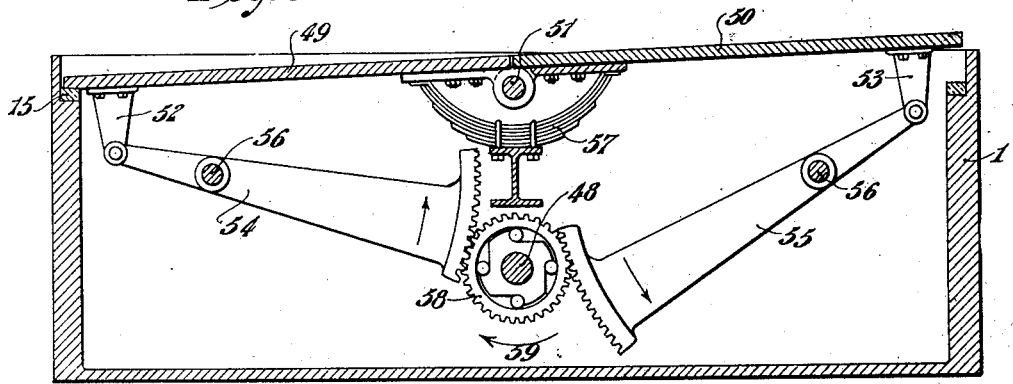
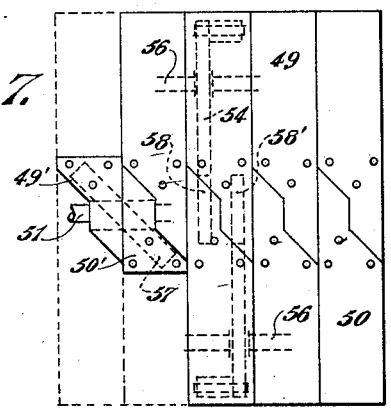
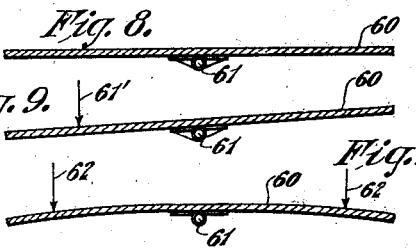
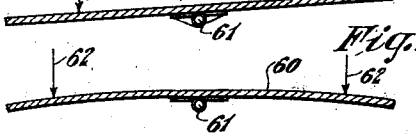
INVENTOR,
Richard J. Talbot,
BY
Harry M. Bowen.
ATTORNEY.

Patented Mar. 15, 1932

1,849,386

UNITED STATES PATENT OFFICE

RICHARD J. TALBOT, OF SPRINGFIELD, MASSACHUSETTS

POWER PLANT

Application filed October 1, 1930. Serial No. 485,655.

This invention relates to improvements in power plants.

An object of the invention is to provide means for utilizing the combined weight and motion, or in other words the momentum, of a moving motor vehicle, as it passes along the roadway, whereby the dynamic energy, to a certain extent, which is stored in the moving vehicle, may be utilized for operating various pieces of mechanism, as an electric generator, a pump or other mechanical energy absorbing machines.

Broadly, my invention comprises a casing member, which is preferably located or placed in the line of travel of the roadway. The upper surface of this casing is provided with a plurality of depressible members which are forced downward by the weight of the moving car or vehicle, as it passes over these members. As these members are depressed in succession by the wheels of the vehicle, or vehicles, suitable mechanism is operated by the downward movement of the members, which, through gearing or otherwise, is connected to drive an electric generator, a pump or other energy absorbing piece of mechanism, as desired.

The construction and arrangement of the gearing is such that rotary motion is always transmitted in the same direction through the interposition of roller clutches, which drives the shaft in one direction and runs idle in the opposite direction. One form of my invention comprises a series of depressible bars that are alternately pivoted on opposite sides of the casing, so that as one wheel of the vehicle leaves one bar, the opposite wheel will immediately engage the next bar, whereby, practically, a continuous power is applied to the driving shaft during such operations.

Suitable means is provided for returning the bars to their original, or normal, horizontal positions, after being depressed.

As a modification of my invention, instead of pivoting the depressible bars on the opposite sides of the casing, I may pivot them at the center line of the casing and employ a single spring, as shown in Fig. 6, which engages the adjacent pivotal inner ends of the levers for returning bars to their original positions. In Fig. 5, I employ a spring for each bar, as well as in Figs. 1, 2 and 3.

An important feature of my invention is to produce as great a rotary motion of the driving shaft of the power plant as possible, with the least downward movement of the depressible bars. I may also utilize the natural resiliency of the bars for returning the same, after being bent or flexed by the weight of a vehicle.

Further objects and nature of my invention will appear in the detailed description when taken in connection with the accompanying drawings and the appended claims.

Referring to the drawings:

Fig. 4 is a top plan view of a further modification in which the depressible bars are pivoted on the center line of the casing.

Fig. 5 is a transverse sectional view on the line 5—5 of Fig. 4 showing two of these bars in their lowered positions.

Fig. 6 is a further modification in which the depressible bars are pivoted in the center line and a spring located beneath the center line for returning the bars.

Fig. 7 is a top plan view of Fig. 6, in which the depressible bars are arranged in staggered relation, and Figs. 8, 9, and 10 are still a further modification in which the natural resiliency of the depressible members is utilized for returning the bars.

Figure 1:
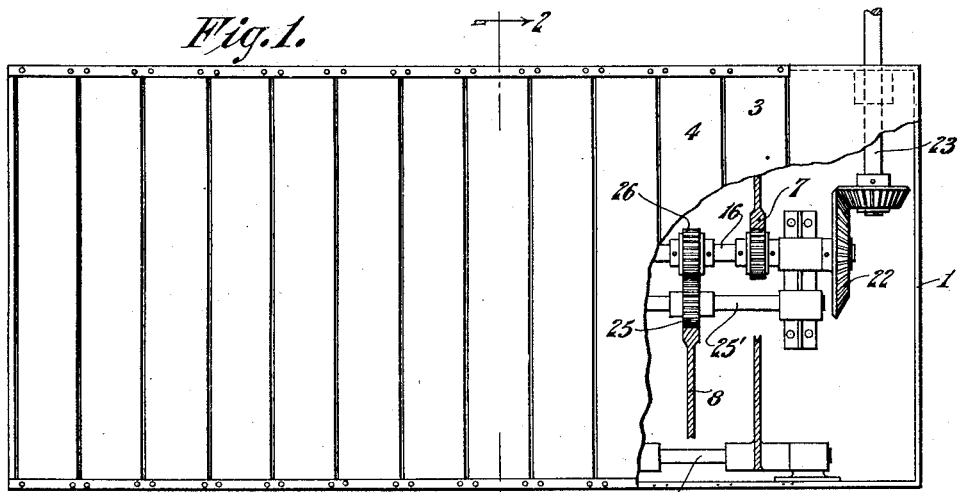
Fig. 1 is a plan view of the casing which is understood to be imbedded in the roadway with some of the bars broken away to illustrate the gearing mechanism.

Referring to the drawings in detail:

1 designates the casing member in all of the views which is preferably formed of heavy cast iron, or other suitable material, which is located below the level of a roadway, indicated at 2. 3 and 4 designate two of the depressible bars which are arranged transversely of the casing. These bars are pivoted at their outer ends to longitudinally arranged rods or shafts 5 and 6. The bar 3 being considered as pivoted on the rod 5 and the bar 4 on the rod 6. Each of these bars is formed with a depending rack member, shown at 7 and 8, preferably formed with a concave inner curved construction having the gear teeth 9 and 10, in order that several teeth may be brought into engagement to prevent breakage.

Springs 10 are located under the freely moving end of each of these bars for returning the same into their upward or full line position, after being depressed, these springs having their opposite ends located in sockets 11 and 12 to prevent displacement.

The casing 1 is formed with longitudinal ledges or shoulders 13 and 14 on each of which is placed a strip of rubber 15 for cushioning the bars in their downward movement.

Figure 2:
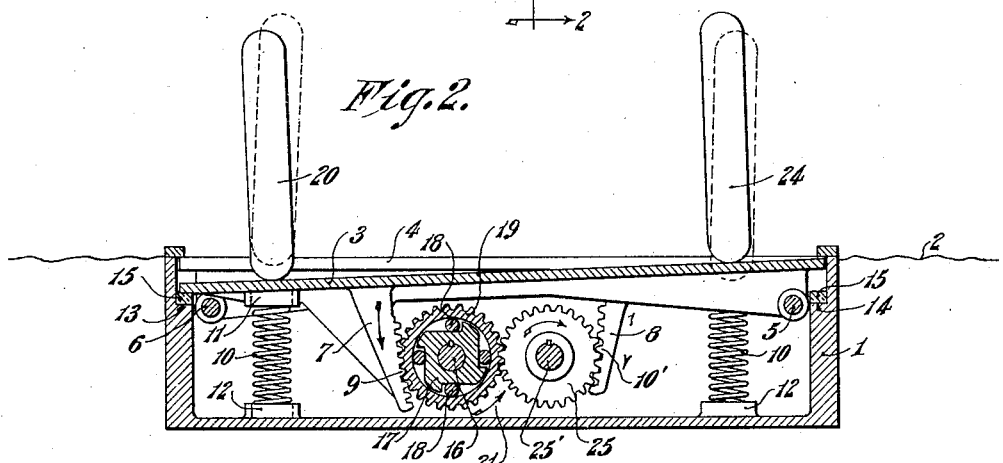
Fig. 2 is a transverse sectional view on the line 2—2 of Fig. 1 showing one of the bars in its depressed position and the adjacent bar elevated with two of the wheels in full lines of the vehicle on the depressed bar.

The main drive shaft is indicated at 16. Secured to this shaft is the roller clutch member having the rollers 18 interposed between the member 17, which is keyed to the shaft 16, and the ring gear 19. The teeth 9 of the sector 7 engages the teeth of the ring gear. When the bar 3 is moved downward by the vehicle wheel 20, as shown in Fig. 2, the teeth on the sector 7 will rotate the ring gear 19 in the direction of the arrow 21 and the shaft 16 in the same direction. This motion having been transmitted through the rollers 18 of the clutch. This motion is transmitted to the bevel gears 22 which drive the shaft 23, which is to be connected to an electric generator, pump or other machine. As the vehicle wheel 20 leaves the bar 3, the opposite vehicle wheel 24 on the opposite side of the vehicle will depress the next or adjacent bar 4 and this movement through the sector rack gear 10' is transmitted to the spur gear 25 on shaft 25', which, through the gear 26, will drive the main shaft 16 in the same direction. Meanwhile, the spring 10 will move the bar 3 upward, but the ring gear 19 will not be operated, because of the roller clutch construction. It will, therefore, be seen that as the wheels of a travelling vehicle move from one bar to the next, they are alternately depressed and practically a continuous motion is transmitted to the shaft 23.

Figure 3:
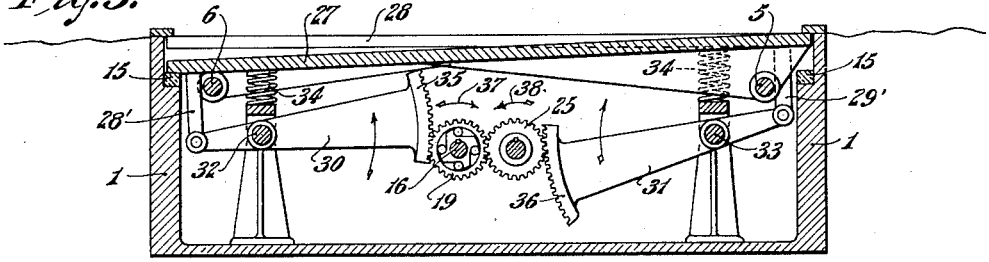
Fig. 3 is a modification in which operating levers, with sector gears, which are moved by the depressible bars, are pivoted intermediate of their ends.

Referring to the construction shown in Fig. 3, 27 and 28 designate two depressible bars which are formed with depending portions 28' and 29', that are pivotally connected to the arc-shaped levers 30 and 31. These levers are pivotally supported on the rods 32 and 33. The bars 27 and 28 are alternately pivoted at their opposite ends to the rods or shafts 5 and 6 and expansion springs 34 are provided for returning the bars 27 and 28 upward, after being moved downward. In this form, the sector gears 35 and 36 are convex and engage the ring gear 19 and the gear 25, as before. When the sector 35 is moved upward by the bar 27, the ring gear 19 is moved in the direction of the arrow 37. When sector 36 is moved upward by depression of bar 28, gear 25 is revolved in the direction indicated by arrow 38 and the gear revolves a roller clutch similar to 19 in the direction indicated at 37. This modification gives a large rotative movement to the gears 19 and 25, because of the difference in lengths of the arms of the sector levers 30 and 31. It is clear that continuous rotary motion will be imparted to the shaft 16 in the same manner, as above described.

Referring to Figs. 4 and 5, bars 39 and 40 are pivoted at the center line of the casing 1 on the fixed shaft 41. Each of these bars are formed with the concave sector members 42 and 43 having gear teeth which engage the gear teeth of the ring gears 44 and 45 of the roller clutches which, through the clutch members 46 and 47 and bevel gears 46' and 47' operate the shaft 48 in the same direction. It is noticed in this construction that the depressible bars 39 and 40 would be moved downward at the same time by the opposite vehicle wheels and the combined weight from the two oppositely located vehicle wheels will drive the shaft 48 in the same direction. Expansion coiled springs 39' and 40' are employed to return the bars after being depressed.

Referring to Figs. 6 and 7, the depressible bars 49 and 50 are also pivoted at their inner ends on the centrally located rod or shaft 51. Their outer ends are provided with the brackets 52 and 53 which operate the sector levers 54 and 55 about their pivots 56. A spring 57 operates to return the bars 49 and 50 as they are alternately depressed. It will be noticed from Fig. 7 that the bars 49 and 50 are arranged in staggered relation, as indicated by the hinges 49' and 50'.

The purpose of this construction is to utilize the power obtained from the weight of one wheel to drive shaft 48 from both the depressed bar 49 and the raised bar 50. The depressed bar 49 operates lever 54 in an upward direction at the same time that the raised bar 50 operates the lever 55 in a downward direction, and the levers 54 and 55 revolve the shaft 48 in the direction, indicated by the arrow 59 by their action on the roller clutches 58 and 59 respectively. The purpose of the hinged members 49' and 50' and the heavy spring 57 is to allow both members 49 and 50 to be depressed simultaneously in the event that a vehicle should drive diagonally over the frame 1, or by any other means impose weight on each of the bars 49 and 50, at the same time. In this event, only one of the levers 54 or 55 would operate the shaft 48.

The purpose of this construction is to utilize the weight of a moving vehicle, when crossing the bars 49 and 50 in a diagonal, instead of a straight, direction.

In Figs. 8, 9 and 10 is shown a bar, 60, pivoted at its mid-length on the shaft 61. This bar depends upon its natural resiliency to return to its original position, after being depressed. Fig. 8 shows it before being engaged by a vehicle wheel at one end, indicated by the arrow 61'; Fig. 9, after being tilted; and Fig. 10, when both ends are bent downward at the same time, as indicated by the arrows 62. It is, of course, to be understood that the bar 60 is connected to a drive shaft in any of the gearing constructions shown in the other figures.

When the bar 49 is moved downward, the ring gear 58 and shaft 48 are rotated in the direction, as shown by the arrow 59. The spring 57 operates to move the lever 55 downward, thus transmitting motion to the ring gear 58 in the same direction.

In the drawings, I have shown the propelling levers and the gearing on the main shaft as uniform throughout, but it is apparent that if the mechanism is placed in highways, where automobiles are operated at high rates of speed, that the sudden application of force to the shaft and operating mechanism will cause undue and unnecessary stresses. Without departing from the principle of the device, in order to provide for such an emergency, when it is designed that the device be so placed, the ratio of the gearing may be so arranged as to make the operation of the levers at one or both ends of the device, impart slight action, or travel, and by gradually increasing the ratio on other levers, in the direction of travel, to accelerate the speed of the main shaft, as the automobile passes over the device.

What I claim is:

1. A power plant designed to be operated by a moving vehicle comprising, in combination, a plurality of bars pivotally connected to a supporting member at one of their ends, a shaft, a second shaft, a roller clutch on the second shaft, a toothed member operatively connected to each bar and engaging a roller clutch, the construction and arrangement being such that the bars are alternately operated by the vehicle and substantially a continuous rotative movement is imparted to the shaft.

2. In combination, in a power plant, a supporting member, depressible bars pivotally supported on a centrally located shaft, a shaft, a roller gear on the shaft, and operative connecting means between the bars and the roller gear.

3. In combination, in a power plant, a supporting member, depressible bars pivotally supported on a centrally located shaft in said member, a driven shaft, a plurality of roller gears on the driven shaft, and operative connecting means between the bars and the roller gears, said means comprising sector levers connected to the bars and pivotally supported intermediate their ends for imparting movement to the roller gear through substantially a long arc.

4. In a power plant of the kind described, a casing, depressible bars pivotally mounted at their centers on the casing, a rotatable shaft, and operative connective toothed section means between the said bars and the shaft.

5. A power plant having in combination, a casing member, a series of transverse bars laterally spaced and pivotally mounted in the center line of the casing and designed to be alternately depressed and released by a vehicle passing thereover, a driving shaft, and clutch means between the bars and the shaft for converting the perpendicular motion of the bars into a rotary motion of the driving shaft.

6. A power plant having in combination, a rotary shaft, a pivot shaft, a plurality of independent transversely arranged depressible members pivotally secured on said pivot shaft, means for operatively connecting the said members to the rotary shaft for rotating the same when the members are successively depressed, said means comprising roller clutches on the shaft and sector gear racks secured to the depressible members, which engage the roller clutches.

7. A power plant comprising a pivot shaft, a plurality of pivotally mounted and laterally spaced depressible bars on said shaft, means for returning the same after being successively depressed, a driven shaft, roller clutches on the driven shaft, and operative connecting means between the clutches and the bars, the said connecting means comprising toothed sector members on the bars which engage the roller clutches.

8. In combination, in a power plant, a supporting casing, a plurality of transverse depressible bars pivotally supported at one side of said casing, a plurality of transverse depressible bars pivotally supported at the opposite side of said casing and spaced one between each of the first named depressible bars, and having rack segments, a driven shaft, a second driven shaft, gears connecting said shafts, operative connecting means between the first named depressible bars and the first named driven shaft comprising gears keyed to the shaft and engaging the rack segments on the bars, operative connecting means between the second named depressible bars and the second driven shaft comprising gears secured to said shaft by roller clutches and segment racks on said bars engaging said gears, and means for returning the depressible bars to a normal position after being depressed.

9. In combination, in a power plant, a rectangular casing member relatively longer than its width, a plurality of transverse bars pivotally secured in said casing member, a driven shaft, and independent operative connecting means between each of said bars and said driven shaft, whereby a continuous rotary motion is imparted to the shaft when the bars are successively depressed by a body moving in a longitudinal direction across said casing member, as described.

RICHARD J. TALBOT.